United States Patent
Heber et al.

(10) Patent No.: US 7,668,624 B2
(45) Date of Patent: Feb. 23, 2010

(54) MAXIMIZED BATTERY RUN-TIME IN A PARALLEL UPS SYSTEM

(75) Inventors: Brian P Heber, Delaware, OH (US); Kevin Eschhofen, Lewis Center, OH (US); Mohammad Nanda Marwali, Lewis Center, OH (US); Terry D Bush, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 11/427,701

(22) Filed: Jun. 29, 2006

(65) Prior Publication Data

US 2007/0007825 A1 Jan. 11, 2007

Related U.S. Application Data

(60) Provisional application No. 60/595,446, filed on Jul. 6, 2005.

(51) Int. Cl.
*G05D 11/00* (2006.01)
(52) U.S. Cl. .................. 700/286; 700/295; 700/79; 700/82; 307/65
(58) Field of Classification Search ............... 700/286, 700/287, 295, 78, 79, 82; 363/71; 307/65
See application file for complete search history.

(56) References Cited

U.S. PATENT DOCUMENTS

| | | | |
|---|---|---|---|
| 3,898,537 A | 8/1975 | Mayse et al. | |
| 4,648,017 A | 3/1987 | Nerone | |
| 4,727,469 A | 2/1988 | Kammiller | |
| 4,782,241 A | 11/1988 | Baker et al. | |
| 4,827,151 A | 5/1989 | Okado | |
| 4,855,888 A | 8/1989 | Henze et al. | |
| 4,864,483 A | 9/1989 | Divan | |
| 5,010,471 A | 4/1991 | Klaassens et al. | |
| 5,025,545 A | 6/1991 | Brown | |
| 5,184,280 A | 2/1993 | Fouad | |

(Continued)

FOREIGN PATENT DOCUMENTS

JP    11-098857    4/1999

(Continued)

OTHER PUBLICATIONS

Braccini, Roberto, International Search Report, International Application No. PCT/US2006/026019, Mar. 23, 2007, European Patent Office, Munich.

(Continued)

*Primary Examiner*—Kidest Bahta
*Assistant Examiner*—Nathan Laughlin
(74) *Attorney, Agent, or Firm*—Locke Lord Bissell & Liddell LLP

(57) ABSTRACT

An uninterruptible power supply (UPS) includes a plurality of UPS modules. Each of the UPS modules has a battery that provides power to a protected load in the event of a utility power failure. A plurality of controllers control how much power each of the batteries deliver to the protected load, and a communication bus allows the controllers to exchange information about the battery voltages. One of the controllers calculates the average battery voltage of the plurality of batteries and adjusts the amount of energy provided by an individual battery such that the battery voltage is about equal to the average battery voltage.

13 Claims, 1 Drawing Sheet

U.S. PATENT DOCUMENTS

| | | | |
|---|---|---|---|
| 5,185,705 A | | 2/1993 | Farrington |
| 5,254,878 A | | 10/1993 | Olsen |
| 5,406,269 A | | 4/1995 | Baran |
| 5,473,528 A | | 12/1995 | Hirata et al. |
| 5,745,356 A | * | 4/1998 | Tassitino et al. ............... 363/71 |
| 5,930,736 A | | 7/1999 | Miller et al. |
| 6,104,660 A | | 8/2000 | Moriya et al. |
| 6,111,387 A | | 8/2000 | Kouzu et al. |
| 6,172,432 B1 | | 1/2001 | Schnackenberg et al. |
| 6,274,950 B1 | | 8/2001 | Gottlieb et al. |
| 6,356,471 B1 | | 3/2002 | Fang |
| 6,362,540 B1 | * | 3/2002 | Hill .............................. 307/52 |
| 6,408,334 B1 | | 6/2002 | Bassman et al. |
| 6,487,356 B1 | | 11/2002 | Harrison et al. |
| 6,639,383 B2 | | 10/2003 | Nelson et al. |
| 2002/0039302 A1 | | 4/2002 | Hanaoka et al. |
| 2003/0016548 A1 | | 1/2003 | Tassitino, Jr. et al. |
| 2003/0048006 A1 | * | 3/2003 | Shelter et al. ................. 307/64 |
| 2003/0132949 A1 | * | 7/2003 | Fallon et al. ................. 345/700 |
| 2006/0293798 A1 | * | 12/2006 | Luo et al. ................... 700/286 |

FOREIGN PATENT DOCUMENTS

| | | |
|---|---|---|
| WO | WO 9750170 A | 12/1997 |
| WO | WO 0129958 A1 | 4/2001 |

OTHER PUBLICATIONS

Braccini, Roberto, Written Opinion of the ISA, International Application No. PCT/US2006/026019, Mar. 23, 2007, European Patent Office, Munich.

El-Bakry, M., Aly, A., Shehata, S. and Khalil, H. "An UPS With Proper Crest Factor and Efficiency for Computer Loads." Energy Conversion Engineering Conference, Honolulu, Jul. 27, 1997, vol. 3, pp. 1726-1731.

Jung, S. and Tzou, Y. "Discrete Feedforward Sliding Mode Control of a PWM Inverter for Sinusoidal Output Waveform Synthesis." Power Electronics Specialists Conference, Taipei, Jun. 20-25, 1994, vol. 1, pp. 552-559.

Wall, R. and Hess, H. "Design and Microcontroller Implementation of a Three Phase SCR Power Converter." Journal of Circuits, Systems, and Computers, Jul. 26, 1996, vol. 6, No. 6, pp. 619-633, World Scientific Publishing Company.

Wong, C., Mohan, N. and He, J. "Adaptive Phase Control for Three Phase PWM AC-To-DC Converters with Constant Switching Frequency." Power Conversion Conference, Yokohama, Apr. 19-21, 1993, pp. 73-78.

Tzou, Y. and Wu, H. "Design and Implementation of a Multiprocessor-based Uninterruptible Power Supply." Power Electronics Specialists Conference, Kyoto, Apr. 11-14, 1988, vol. 2, pp. 650-657.

Martins, A., Carvalho, A. and Araujo, A. "A Control Method for High Power UPSs in Parallel Operation." Proceedings of the 38th Midwest Symposium on Circuits and Systems, Rio de Janeiro, Aug. 13-16, 1995, vol. 1, pp. 208-211.

Notification of First Office Action for Corresponding Chinese Application No. 200680024619X issued Dec. 26, 2008, State Intellectual Property Office of P.R.C.

* cited by examiner

MAXIMIZED BATTERY RUN-TIME IN A PARALLEL UPS SYSTEM

CROSS-REFERENCE TO RELATED APPLICATION

This application is a nonprovisional application of U.S. Provisional Patent Application No. 60/595,446, filed on Jul. 6, 2005, which is incorporated by reference.

BACKGROUND

The present invention relates generally to uninterruptible power supplies ("UPS"), and more particularly, to methods and apparatus for maximizing the battery runtime in a parallel UPS system.

Uninterruptible power supplies are designed to provide continuous power to a critical load in the event of a temporary failure of utility power. In some systems, a plurality of UPS modules are connected together in parallel to supply the critical load. Each UPS module generally includes a rectifier, a battery, and an inverter. In the event of an interruption of utility power, the critical load will be supplied by DC power from the batteries in the UPS modules. This DC power is converted to AC power by the inverters on the UPS modules before being passed to the critical bus. One disadvantage of a system using parallel UPS modules is that the load is distributed evenly across each of the batteries in the UPS modules. There is no guarantee, however, that the batteries will have the same energy delivery capabilities. For example, one battery may be relatively new and able to deliver twice as much runtime as another battery that is relatively old. So the UPS with the "old" battery may terminate operation due to an earlier End of Discharge ("EOD") before the UPS with the new battery. In a system with multiple UPS modules, the module with the weakest battery may shut down first, followed by the next weakest, and so on. Each time a UPS module shuts down, the remaining modules experience an increased share of the load. This diminishes the runtime available for the remaining batteries and may overload the remaining UPS modules. The present application addresses these shortcomings and provides other advantages that will be apparent to those skilled in the art.

SUMMARY

One version of the invention relates to an uninterruptible power supply that has a plurality of batteries that provide power to a protected load in the event of a utility power failure. It includes a plurality of controllers that control how much power each of the plurality of batteries deliver to the protected load, and a communication bus that allows the controllers to exchange information about the battery voltages. At least one of the controllers calculates the average battery voltage of the plurality of batteries and adjusts the amount of energy provided by an individual battery such that the battery voltage is about equal to the average battery voltage. This system also works with UPS modules that have batteries of different types and with UPS modules that have different energy storage systems such as a flywheel. Other embodiments of the invention are set forth in the detailed description of the invention below.

BRIEF DESCRIPTION OF THE DRAWINGS

Other objects and advantages of the invention will become apparent upon reading the following detailed description and upon reference to the drawings in which.

Figure 1:
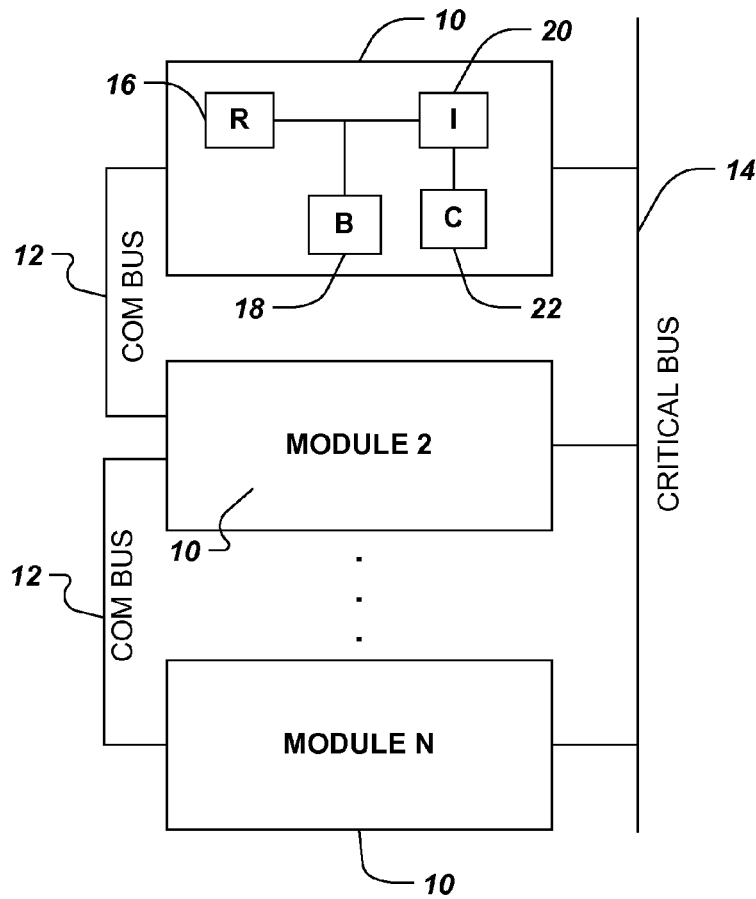
FIG. 1 is a schematic diagram of a parallel UPS system according to an embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates an uninterruptible power supply system according to an embodiment of the invention. The system includes a plurality of UPS modules 10. Each UPS module in this example has a rectifier 16, a battery 18, an inverter 20, and a controller 22. The rectifier 16 converts AC power received by the module 10 to DC power. The AC power received by the module 10 may come from utility power or other AC power sources such as generators. The inverter 20 converts the DC power to a regulated conditioned AC power. The battery 18 provides reserve DC power in the event there is a failure of the AC power source.

The UPS modules 10 are coupled to a communication bus 12. The communication bus 12 allows the UPS modules 10 to exchange information and commands necessary to operate the UPS modules, such as the battery voltage of each UPS module 10 in the system. The communication bus 12 is preferably a digital communication bus, such as a Control Area Network ("CAN") bus, but other conventional digital buses, such as Ethernet could be substituted as a matter of design choice. Alternatively, an analog bus could be substituted as a matter of design choice as long as the bus can be shared between the UPS modules 10 to facilitate load sharing and other parallel system operations.

The outputs of the UPS modules 10 are coupled to the critical bus 14. The critical bus 14 delivers power to the critical load (not shown). The critical load is any load that is intended to be protected from power interruptions, and typical examples include computer and medical equipment and the like. The UPS modules 10 may be coupled to the critical bus 14 by conventional means, such as a bypass static switch. The bypass static switch may be common, or each UPS module 10 may be provided with its own bypass static switch. In the event of an interruption of utility power, the critical load will be supplied by DC power from the batteries 18 in the UPS modules 10. This DC power is converted to AC power by the inverters 20 on the UPS modules 10 before being passed to the critical bus 14.

The controllers 22 in each UPS module adjust the load supplied by the module 10 to the critical bus 14. It is advantageous that the controllers 22 are PID controllers that include a feedback control loop, but other controllers may be substituted as a matter of design choice. The controllers 22 depicted in the embodiment shown in FIG. 1 are PID controllers that have been implemented in software on a microprocessor and use digital signal processing ("DSP") techniques.

According to one embodiment of the invention, the feedback control loop adjusts the load of each UPS module based on the average battery voltage. With reference to FIG. 1, the average battery voltage is given by the equation: $Vbatt\_average = (Vbatt\_1 + Vbatt\_2 + Vbatt\_3 \ldots + Vbatt\_n)/n$ where n is the number of modules on-line. The battery voltage of each battery is communicated over the CAN bus to the other UPS modules in the system. The average battery calculation can be made at a central processor and then passed over the CAN bus, or each UPS module can make the calculation individually.

Figure 2:
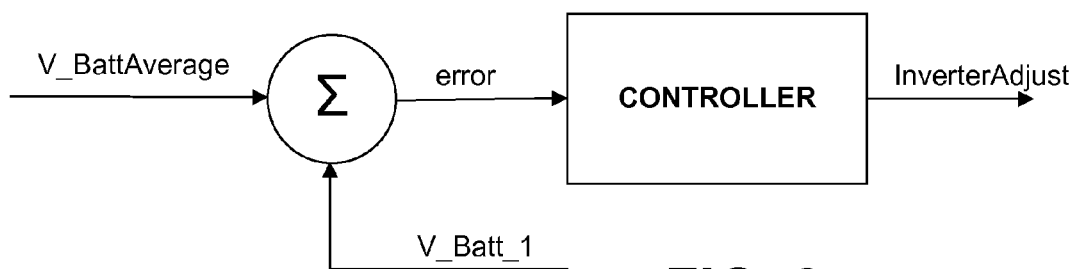
FIG. 2 is a schematic diagram of a control loop for adjusting the output of an inverter according to an embodiment of the invention.

According to one embodiment of the invention, the feedback loop, depicted in FIG. 2, will increase the load on an individual battery in a UPS module if the battery's voltage is greater than the average battery voltage and decrease the load if the battery voltage is less than the average battery voltage. As shown in FIG. 2, a signal representing the average battery voltage ("Vbatt_average") is summed with a signal representing the battery voltage of the battery in the particular UPS module. The result of the summation is provided as an error signal to the controller. The controller then sends a signal to the inverter to increase or decrease the amount of energy supplied by the battery in the UPS modules. If the critical bus is an AC bus, then the phase angle of the power supplied by the inverter is advanced with respect to the phase angle of the power on the critical bus to increase the load on the inverter and, hence, decrease the battery voltage relative to the average battery voltage. Conversely, the relative phase angle is decreased to lower the load on the inverter and raise the battery voltage. In this way, the load will be distributed across all the UPS modules that are on battery such that the battery voltage of each battery is adjusted to Vbatt_average, plus or minus a small amount of error that may be present in the control loops. Of course, the accuracy and speed of the control loops is a matter of design choice. Those of skill in the art will recognize that a similar control could be used in a system in which the critical bus is a DC bus, except, of course, that there is no phase angle to adjust and the output voltage of the inverter is adjusted so that it will provide more or less power depending on the battery voltage.

According to another embodiment of the invention, if one or more of the UPS modules looses utility power and switches to battery operation, the modules can coordinate together to handle the load in an efficient manner. In this embodiment, the UPS module (or modules) that is on battery power first reduces its share of the critical load to zero. By reducing the load to zero, the battery of the UPS module need only supply enough energy to make up for the inverter losses and, therefore, can run for an extended period of time. Reducing its share of the load to zero, however, could overload one or more of the inverters in the remaining UPS modules. The inverters, however, are typically designed to operated in an overload condition for a brief period of time, for example, ten minutes. A signal representing the overload condition is passed over the CAN bus to the module or modules that are on battery. The UPS module(s) will start to provide power to the critical load from its battery, increasing the amount of power provided until the remaining UPS modules are not overloaded.

According to another embodiment of the invention, the UPS modules may shift load between each other depending on the estimated battery runtime left for their various batteries balanced against the overload runtime. This embodiment is particularly advantageous if one (or more) UPS modules looses utility and operates from battery, and the battery runtime is less than the overload runtime of the remaining modules. Typically, inverters are as designed to run at 125% for 10 minutes. If, for example, a UPS module is within 10 minutes or less of its End of Discharge ("EOD"), then it may be advantageous to reduce the load on that UPS module and allow other modules in the system to temporarily operate in an overload condition, thus preserving battery life for as long as possible. Thus, for example, in a two module system, if the first UPS module is near EOD and has 50% load, then it could give up 25% to the second UPS module, that might have 100% for example, hence placing that module in overload. This would extend the battery run time and keep the critical load protected. Of course, this embodiment is operable with any number of UPS modules. In this case, the UPS module (or modules) that is on battery reduces the power it is supplying thus causing the remaining UPS modules to become overloaded. The control loop balances the estimated battery runtime with the overload runtime. Those of skill in the art will be familiar with methods for estimating the battery runtime, which will depend on the batteries being used and other factors unique to the specific implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Consequently, all such similar applications are considered within the scope and spirit of the invention. Accordingly, the protection sought herein is as set forth in the claims below.

What is claimed is:

1. A method of controlling a plurality of battery voltages in a plurality of uninterruptible power supply (UPS) modules, each of the UPS modules having an inverter for providing power to a load, each of the inverters receiving power from a battery, the method comprising:

determining an average voltage of the batteries from at least two of the UPS modules;

comparing the battery voltage from the at least two UPS modules to the average battery voltage; and generating a control signal responsive to the comparison that causes the inverters to adjust the amount of power delivered by the batteries to the load, the control signal intentionally causing an imbalance by intentionally increasing the amount of power delivered from at least one of the batteries who's voltage is greater than the average battery voltage and intentionally decreasing the amount of power delivered from at least one of the batteries who's voltage is less than the average battery voltage, wherein intentionally causing an imbalance comprises intentionally placing one or more of the inverters in an overload condition.

2. An uninterruptible power supply (UPS) system comprising:

a plurality of UPS modules, each of the UPS modules including a battery that provides power to a protected load during a utility power failure;

a plurality of controllers that control how much power each of the batteries deliver to the protected load;

a communication bus that allows the controllers to exchange information about the battery voltages;

wherein at least one of the controllers calculates an average battery voltage of the plurality of batteries and adjusts the amount of energy provided by at least one of the batteries, and wherein the at least one controller outputs a control signal intentionally causing an imbalance by intentionally increasing the amount of power delivered from at least one of the batteries who's voltage is greater than the average battery voltage and intentionally decreasing the amount of power delivered from at least one of the batteries who's voltage is less than the average battery voltage, wherein intentionally causing an imbalance comprises intentionally placing one or more of the inverters in an overload condition.

3. The UPS system of claim 2, wherein the at least one controller compares the battery voltage for the at least one battery to the average battery voltage.

4. The UPS system of claim 2, wherein the at least one controller receives a first signal responsive to the average battery voltage and a second signal responsive to the voltage of the at least one battery.

5. The method of claim 1, further including estimating a runtime of at least one of the batteries.

6. The method of claim 5, wherein estimating a runtime of at least one of the batteries further includes:

detecting when one or more of the UPS modules looses utility power; and estimating the runtime of the battery associated with the UPS module that has lost utility power.

7. The method of claim 6, further including balancing the estimated battery runtime of the battery associated with the UPS module that has lost utility power against an overload runtime of the inverter intentionally placed in the overload condition.

8. The method of claim 1, wherein intentionally causing an imbalance comprises intentionally reducing an amount of energy supplied through one or more of the inverters to zero.

9. The method of claim 1, wherein intentionally causing an imbalance comprises intentionally reducing an amount of energy supplied through one or more of the inverters to zero and then increasing the an amount of energy supplied through one or more of the inverters until none of the inverters are in an overload condition.

10. A method of controlling a plurality of battery voltages in a plurality of uninterruptible power supply (UPS) modules, each of the UPS modules having an inverter for providing power to a load, each of the inverters receiving power from a battery, the method comprising:

generating a control signal that intentionally reduces an amount of energy supplied through one or more of the inverters to zero, wherein the control signal also intentionally places one or more of the inverters in an overload condition;

estimating a runtime of at least one of the batteries; and balancing the estimated battery runtime against an overload runtime of the inverter intentionally place in the overload condition.

11. The method of claim 10, further including increasing the amount of energy supplied through the inverter previously reduced to zero, until the overloaded inverter is no longer overloaded.

12. The method of claim 10, further including further including increasing the amount of energy supplied through the inverter previously reduced to zero.

13. A method of controlling a plurality of battery voltages in a plurality of uninterruptible power supply (UPS) modules, each of the UPS modules having an inverter for providing power to a load, each of the inverters receiving power from a battery, the method comprising:

generating a control signal that intentionally places one or more of the inverters in an overload condition;

estimating a runtime of at least one of the batteries; and balancing the estimated battery runtime against an overload runtime of the inverter intentionally place in the overload condition.

* * * * *